(12) United States Patent
Takahashi

(10) Patent No.: US 9,610,822 B2
(45) Date of Patent: *Apr. 4, 2017

(54) AIR CONDITIONING DEVICE FOR VEHICLE

(75) Inventor: Yasufumi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 459 days.

This patent is subject to a terminal disclaimer.

(21) Appl. No.: 14/122,122

(22) PCT Filed: Mar. 9, 2012

(86) PCT No.: PCT/JP2012/001646
§ 371 (c)(1),
(2), (4) Date: Nov. 25, 2013

(87) PCT Pub. No.: WO2012/160735
PCT Pub. Date: Nov. 29, 2012

(65) Prior Publication Data
US 2015/0082820 A1 Mar. 26, 2015

(30) Foreign Application Priority Data
May 26, 2011 (JP) ................ 2011-117702

(51) Int. Cl.
*F25B 27/00* (2006.01)
*B60H 1/32* (2006.01)
(Continued)

(52) U.S. Cl.
CPC ....... *B60H 1/00007* (2013.01); *B60H 1/0005* (2013.01); *B60H 1/00057* (2013.01);
(Continued)

(58) Field of Classification Search
CPC ............ B60H 1/00021; B60H 1/00028; B60H 1/00564; B60H 2001/00121; B60H 1/0005;
(Continued)

(56) References Cited

U.S. PATENT DOCUMENTS 5,299,431 A * 4/1994 Iritani ................ B60H 1/00021
62/159
6,016,967 A 1/2000 Takechi et al.
(Continued)

FOREIGN PATENT DOCUMENTS

CN 101033707 9/2007
DE 197 44 276 4/1998
(Continued)

*Primary Examiner* — Ryan J Walters
*Assistant Examiner* — Joseph Trpisovsky
(74) *Attorney, Agent, or Firm* — Hamre, Schumann, Mueller & Larson, P.C.

(57) ABSTRACT

An vehicle air conditioner (1A) includes a duct (3) in which a partition member (4) forming a first flow path (3A) and a second flow path (3B) is provided, and a heat pump circuit (2A). In the heat pump circuit (2A), a first indoor heat exchanger (12A) that contributes mainly to heating is located in the first flow path (3A) or faces an outlet of the first flow path (3A), and a second indoor heat exchanger (12B) that contributes mainly to cooling is located in the second flow path (3B). The ratio between an internal air and an external air within air flowing through each of the first flow path (3A) and the second flow path (3B) is adjustable. The duct (3) is provided with at least one of a heating exhaust port (35) for discharging air cooled in the second indoor heat exchanger (12B) to the outside of the vehicle interior in heating operation, and a cooling exhaust port (36) for discharging air heated in the first indoor heat exchanger (12A) to the outside of the vehicle interior in cooling operation. This configuration enables the air within the
(Continued)

vehicle interior, the temperature of which has been adjusted by heating or cooling, to be efficiently utilized without wasting energy by discharging the air as it is to the outside.

12 Claims, 9 Drawing Sheets

(51) Int. Cl.
| | |
|---|---|
| *F25D 17/06* | (2006.01) |
| *F25D 17/04* | (2006.01) |
| *B60H 1/00* | (2006.01) |
| *B60H 1/03* | (2006.01) |
| *F25B 29/00* | (2006.01) |
| *F25B 41/04* | (2006.01) |

(52) U.S. Cl.
CPC ............ *B60H 1/00921* (2013.01); *B60H 1/03* (2013.01); *F25B 29/003* (2013.01); *F25B 41/046* (2013.01); *B60H 2001/00085* (2013.01); *B60H 2001/00099* (2013.01); *B60H 2001/00135* (2013.01); *B60H 2001/00157* (2013.01); *B60H 2001/00178* (2013.01)

(58) Field of Classification Search
CPC ............ B60H 1/00057; B60H 1/00864; B60H 1/00835; B60H 1/00821; B60H 1/00849; B60H 1/00671; B60H 2001/00707; F25B 2313/0214; F24F 13/04; F25D 17/045

See application file for complete search history.

(56) References Cited

U.S. PATENT DOCUMENTS

| | | | |
|---|---|---|---|
| 6,166,351 A | 12/2000 | Yamamoto | |
| 6,352,102 B1* | 3/2002 | Takechi | B60H 1/00064 165/203 |
| 7,461,517 B2* | 12/2008 | Kurosawa | B60H 1/00921 62/324.1 |
| 2006/0270333 A1* | 11/2006 | Hirai | B60H 1/00849 454/75 |
| 2007/0214817 A1 | 9/2007 | Inaba | |
| 2009/0193830 A1* | 8/2009 | Yoshioka | B60H 1/0005 62/239 |
| 2011/0036117 A1 | 2/2011 | Frohling et al. | |

FOREIGN PATENT DOCUMENTS

| | | |
|---|---|---|
| DE | 199 54 571 | 5/2000 |
| EP | 0 913 283 | 10/1997 |
| EP | 0 823 344 | 2/1998 |
| JP | 60-131407 U | 9/1985 |
| JP | 61-102306 | 5/1986 |
| JP | 5-155236 | 6/1993 |
| JP | 5-221229 | 8/1993 |
| JP | 8-091042 | 4/1996 |
| JP | 8-238919 | 9/1996 |
| JP | 3433297 B2 | 5/2003 |
| JP | 2003-291625 | 10/2003 |
| JP | 2011-037434 | 2/2011 |

* cited by examiner

AIR CONDITIONING DEVICE FOR VEHICLE

TECHNICAL FIELD

The present invention relates to vehicle air conditioners for cooling and heating vehicle interiors.

BACKGROUND ART

Conventionally, for example, in an automobile equipped with a gasoline engine, a heat pump is used for cooling, while engine waste heat is used for heating. In recent years, hybrid automobiles in which the amount of engine waste heat is small, and electric automobiles in which engine waste heat cannot be used, have become increasingly widespread. Accordingly, vehicle air conditioners using a heat pump not only for cooling but also for heating have been developed. For example, Patent Literature 1 discloses a vehicle air conditioner 100 as shown in FIG. 9A.

The vehicle air conditioner 100 includes a heat pump circuit 110 through which a refrigerant flows only in one direction. The heat pump circuit 110 includes a compressor 121, a first indoor heat exchanger 131, a first expansion valve 122, an outdoor heat exchanger 133, a second expansion valve 123, and a second indoor heat exchanger 132. These devices are connected in this order by flow paths. In addition, the heat pump circuit 110 is provided with a shortcut path bypassing the first expansion valve 122, and a shortcut path bypassing the second expansion valve 123. These shortcut paths are provided with a first on-off valve 141 and a second on-off valve 142, respectively.

The first indoor heat exchanger 131 and the second indoor heat exchanger 132 are disposed in a duct 150 through which internal air or external air flows selectively. The internal air or the external air is drawn into the duct 150 from one end closer to the second indoor heat exchanger 132 by an air blower which is not shown. The internal air or the external air is blown into the vehicle interior from the other end closer to the first indoor heat exchanger 131. That is, the second indoor heat exchanger 132 is located on the windward side with respect to the first indoor heat exchanger 131.

In the duct 150, as shown in FIG. 9B, a first damper 161 is provided on the windward side with respect to the second indoor heat exchanger 132, and a second damper 162 is provided on the windward side with respect to the first indoor heat exchanger 131.

In the cooling operation of the vehicle air conditioner 100 having the above configuration, the first on-off valve 141 is opened, and the second on-off valve 142 is closed. In addition, the first damper 161 and the second damper 162 are set at positions shown by solid lines in FIG. 9B. Therefore, the refrigerant discharged from the compressor 121 flows into the outdoor heat exchanger 133 without releasing heat in the first indoor heat exchanger 131, releases heat in the outdoor heat exchanger 133, and is then expanded by the second expansion valve 123. The expanded refrigerant absorbs heat in the second indoor heat exchanger 132, and is then drawn into the compressor 121.

On the other hand, in the heating operation, the first on-off valve 141 is closed, and the second on-off valve 142 is opened. In addition, the first damper 161 and the second damper 162 are set at positions shown by chain double-dashed lines in FIG. 9B. Therefore, the refrigerant discharged from the compressor 121 releases heat in the first indoor heat exchanger 131, and is expanded by the first expansion valve 122. The expanded refrigerant flows into the outdoor heat exchanger 133, absorbs heat in the outdoor heat exchanger 133, and is then drawn into the compressor 121 without further absorbing heat in the second indoor heat exchanger 132.

CITATION LIST

Patent Literature

PLT 1: JP Patent No. 3433297

SUMMARY OF INVENTION

Technical Problem

When external air is drawn into the duct 150, that is, when the external air is introduced into the vehicle interior thorough the duct 150, the same amount of internal air (air in the vehicle interior) as the introduced external air needs to be discharged to the outside. However, when the internal air whose temperature has been adjusted by heating or cooling is discharged directly to the outside, the energy required for adjusting the temperature of the internal air is wasted.

In view of such circumstances, the present invention aims to provide a vehicle air conditioner that can efficiently use energy.

Solution to Problem

In order to solve the above problem, the present invention provides a vehicle air conditioner that cools and heats a vehicle interior, the vehicle air conditioner including: a duct having an internal air inlet port and an external air inlet port at one end portion thereof, and a blowing port at another end portion thereof; a partition member provided so that a first flow path and a second flow path are formed in the duct; a first air blower disposed in the first flow path; a second air blower disposed in the second flow path; a first intake damper that adjusts a ratio between an amount of internal air flowing into the first flow path through the internal air inlet port and an amount of external air flowing into the first flow path through the external air inlet port; a second intake damper that adjusts a ratio between an amount of internal air flowing into the second flow path through the internal air inlet port and an amount of external air flowing into the second flow path through the external air inlet port; and a heat pump circuit including a first indoor heat exchanger that is disposed in the duct so as to be located in the first flow path or to face an outlet of the first flow path and that contributes mainly to heating, a second indoor heat exchanger that is disposed in the duct so as to be located in the second flow path and that contributes mainly to cooling, and an outdoor heat exchanger disposed outside the vehicle interior. The duct is provided with at least one of a heating exhaust port for discharging air cooled in the second indoor heat exchanger to the outside of the vehicle interior in heating operation, and a cooling exhaust port for discharging air heated in the first indoor heat exchanger to the outside of the vehicle interior in cooling operation.

Advantageous Effects of Invention

According to the above configuration, in the case where the heating exhaust port is provided, heat removal from internal air having been heated by heating can be allowed to take place in the second indoor heat exchanger in the course of discharge of the internal air to the outside. On the other hand, in the case where the cooling exhaust port is provided, heat supply to internal air having been cooled by cooling can be allowed to take place in the first indoor heat exchanger in the course of discharge of the internal air to the outside. That is, in either case, energy can be efficiently used by effectively utilizing the internal air to be discharged to the outside. Moreover, since the ratio between the internal air and the external air is adjustable in each of the first flow path and the second flow path, it is possible to cool or heat only the internal air to be discharged at the time of recovering energy.

DESCRIPTION OF EMBODIMENTS

Hereinafter, embodiments of the present invention will be described with reference to the accompanying drawings. The following description relates to examples of the present invention, and the present invention is not limited by the examples.

First Embodiment

Figure 1:
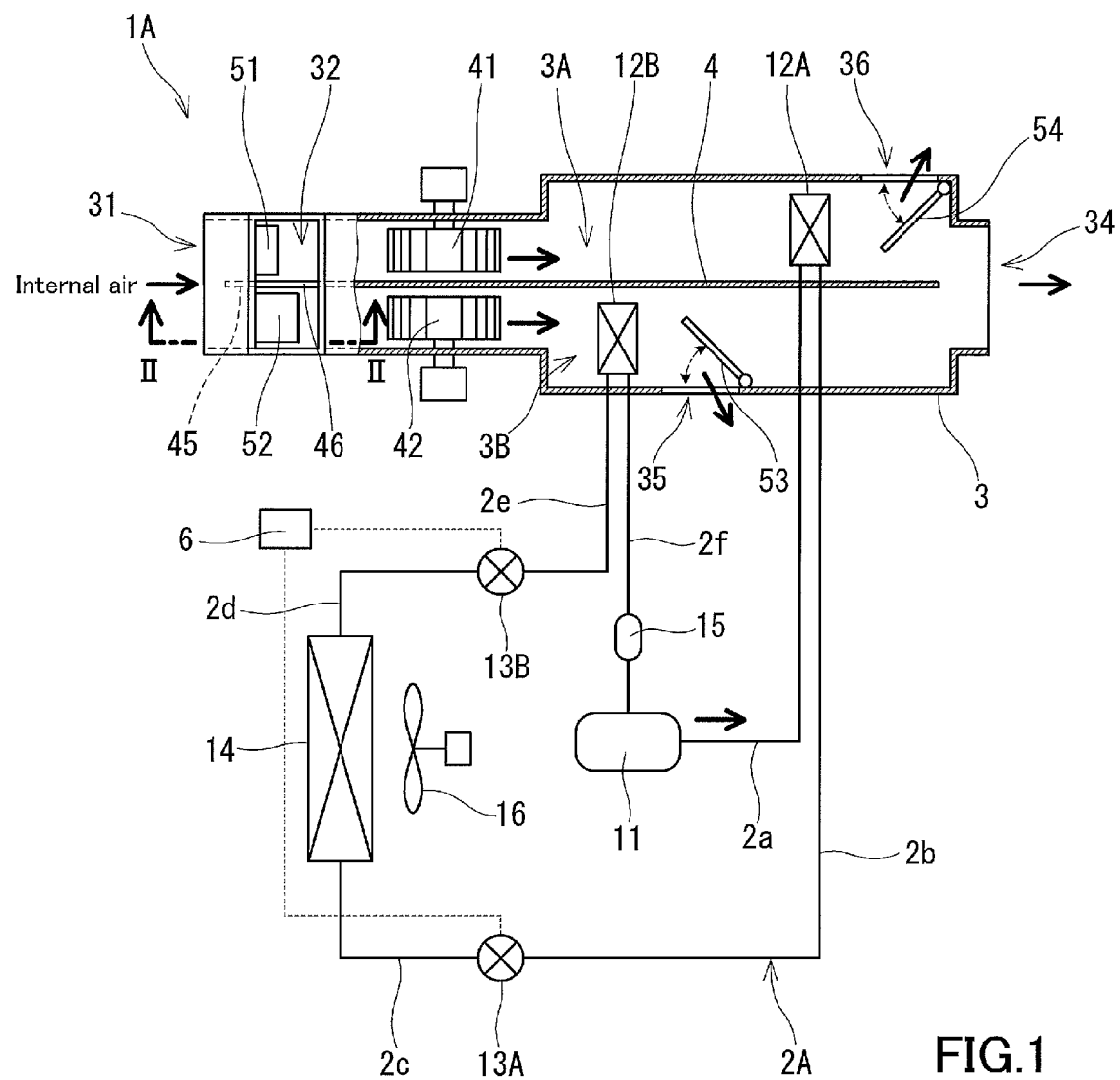
FIG. 1 is a configuration diagram of a vehicle air conditioner according to a first embodiment of the present invention.
Figure 2:
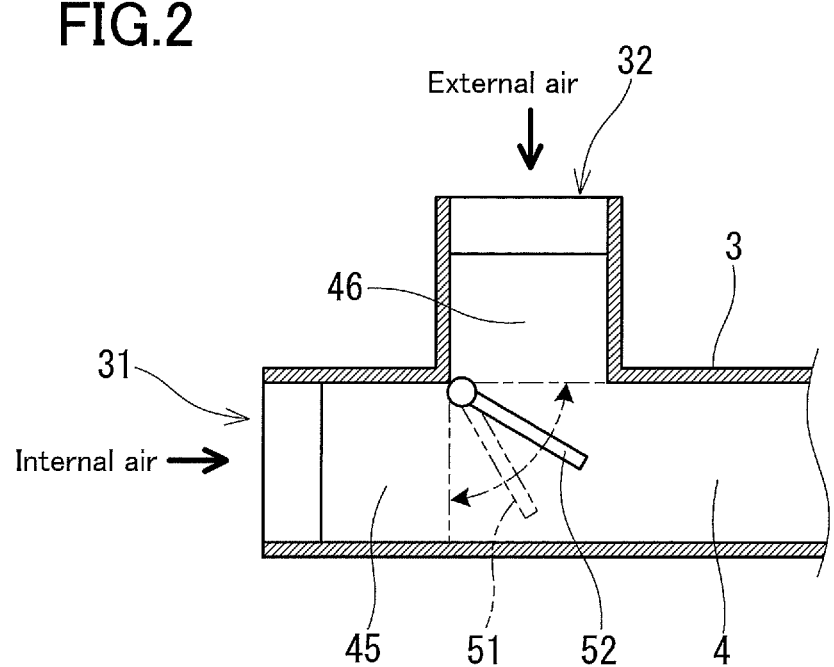
FIG. 2 is a cross-sectional view taken along the line II-II in FIG. 1.

FIG. 1 and FIG. 2 each are a configuration diagram of a vehicle air conditioner 1A according to a first embodiment of the present invention. The vehicle air conditioner 1A cools and heats a vehicle interior which is not shown, and includes a duct 3 for introducing external air into the vehicle interior and circulating internal air, a heat pump circuit 2A in which a refrigerant is circulated, and a controller 6 (a part of signal lines is drawn in FIG. 1 to simplify the drawing). FIG. 1 illustrates schematically the shape of the duct 3, and the actual shape of the duct 3 may be such that a portion of the duct 3 is expanded or undulated in conformity with a space in which the duct 3 is placed.

Figure 4:
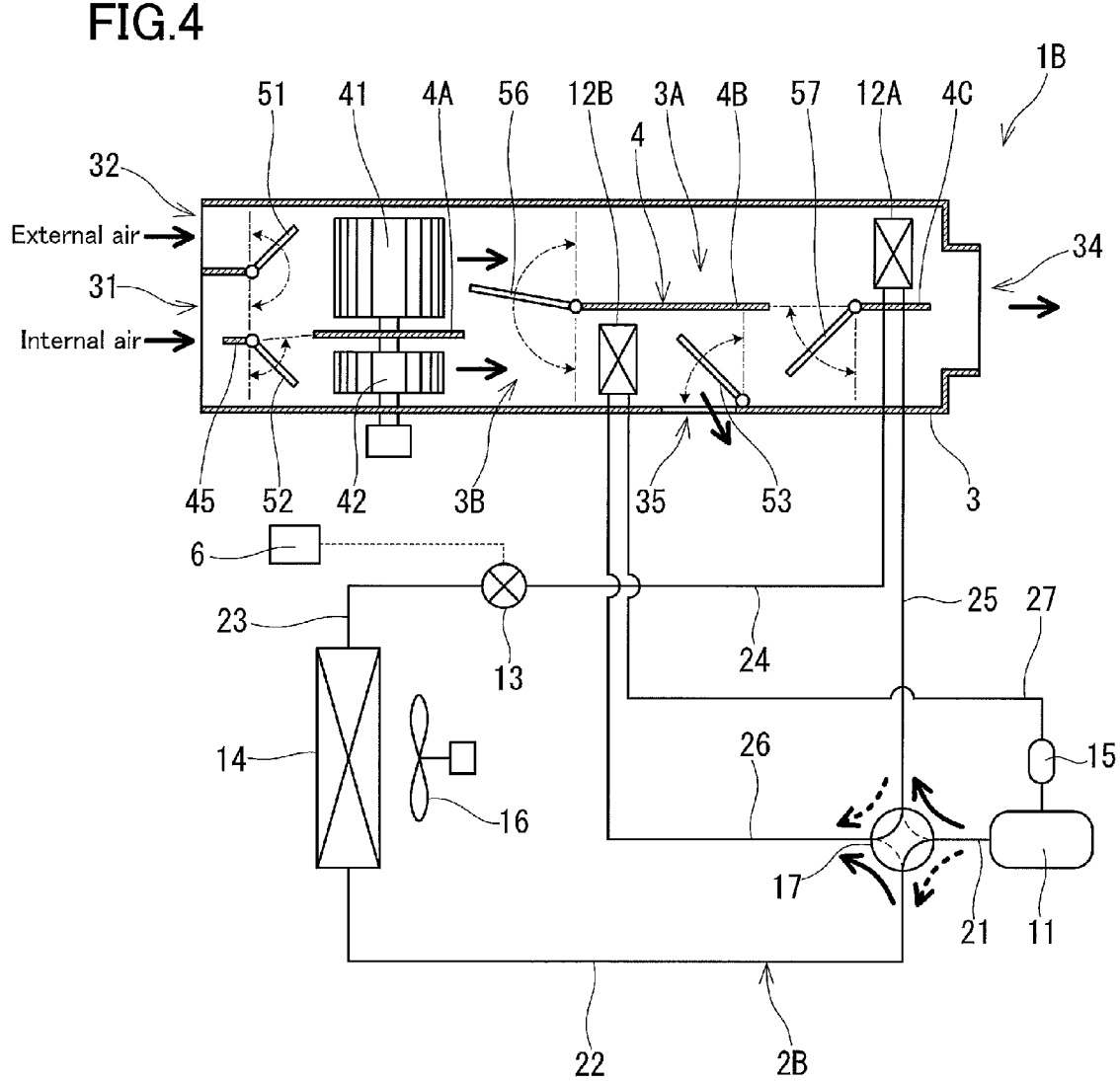
FIG. 4 is a configuration diagram of a vehicle air conditioner according to a second embodiment of the present invention.

The duct 3 has, at one end portion thereof, an external air inlet port 32 for drawing the external air into the duct 3 and an internal air inlet port 31 for drawing the internal air into the duct 3. The duct 3 has, at another end portion thereof, a blowing port 34 for blowing temperature-controlled air into the vehicle interior. The opening direction of the internal air inlet port 31 may be perpendicular to the opening direction of the external air inlet port 32 as shown in FIG. 1 and FIG. 2, or may be parallel to the opening direction of the external air inlet port 32 as shown in FIG. 4 that is another embodiment. The blowing port 34 may be branched into a plurality of ports such as a defroster blowing port, a face blowing port, and a foot blowing port.

In the duct 3, a partition member 4 is provided so that a first flow path 3A and a second flow path 3B are formed. In the present embodiment, the partition member 4 partitions throughout the approximately entire region of the internal space of the duct 3 except for the both end portions, and the first flow path 3A and the second flow path 3B are formed across the approximately entire length of the duct 3. Moreover, in the duct 3, an internal air dividing wall 45 dividing the internal air inlet port 31 and an external air dividing wall 46 dividing the external air inlet port 32 are provided so as to be continuous with the partition member 4. That is, the internal air inlet port 31 and the external air inlet port 32 each are in direct communication with both of the first flow path 3A and the second flow path 3B, and the internal air can flow into both of the first flow path 3A and the second flow path 3B through the internal air inlet port 31 and the external air can flow into both of the first flow path 3A and the second flow path 3B through the external air inlet port 33.

In the first flow path 3A, a first blower 41 is disposed as a first air blower of the present invention. In the second flow path 3B, a second blower 42 is disposed as a second air blower of the present invention. The first blower 41 and the second blower 42 generate air flows in the first flow path 3A and the second flow path 3B, respectively, traveling from one end to another end of the duct 3. In the present embodiment, the first blower 41 and the second blower 42 are driven by different motors as shown in FIG. 1. The first air blower and the second air blower of the present invention are not limited to blowers, and they may be fans.

Further, in the duct 3, a first intake damper 51 and a second intake damper 52 that have a swing axis between the internal air inlet port 31 and the external air inlet port 32 are provided corresponding to the first flow path 3A and the second flow path 3B. The first intake damper 51 swings between an internal air blocking position for closing the internal air inlet port 31 and an external air blocking position for closing the external air inlet port 32 on the first flow path 3A side. The second intake damper 52 swings between an internal air blocking position for closing the internal air inlet port 31 and an external air blocking position for closing the external air inlet port 32 on the second flow path 3B side. That is, the first intake damper 51 adjusts a ratio between an amount of the internal air flowing into the first flow path 3A through the internal air inlet port 31 and an amount of the external air flowing into the first flow path 3A through the external air inlet port 32, and the second intake damper 52 adjusts a ratio between an amount of the internal air flowing into the second flow path 3B through the internal air inlet port 31 and an amount of the external air flowing into the second flow path 3B through the external air inlet port 32.

The heat pump circuit 2A includes a compressor 11, a first indoor heat exchanger 12A, a first expansion valve 13A, an outdoor heat exchanger 14, a second expansion valve 13B, and a second indoor heat exchanger 12B. These devices (11, 12A, 13A, 14, 13B, 12B) are connected in this order in a loop by first to sixth flow paths 2a to 2f. As the refrigerant, R134a, R410A, HFO-1234yf, HFO-1234ze, $CO_2$, or the like can be used. In addition, other HFC refrigerants, other HC refrigerants, or the like, can also be used.

The compressor 11 is driven by an electric motor which is not shown. The compressor 11 compresses the refrigerant drawn through a suction port, and discharges the refrigerant through a discharge port. The electric motor may be disposed inside the compressor 11 or may be disposed outside the compressor 11. In an electric automobile, for example, the electric motor may be a motor for driving a vehicle. The discharge port of the compressor 11 is connected to the first indoor heat exchanger 12A via the first flow path 2a.

The first indoor heat exchanger 12A contributes mainly to heating, and is disposed in the duct 3. In the present embodiment, the first indoor heat exchanger 12A is disposed so as to be located in the first flow path 3A. The first indoor heat exchanger 12A performs heat exchange between the refrigerant and internal air and/or external air supplied by the first blower 41. In the present embodiment, the first indoor heat exchanger 12A functions as a condenser both in the cooling operation and in the heating operation. The first indoor heat exchanger 12A is connected to the first expansion valve 13A via the second flow path 2b.

In the cooling operation, the first expansion valve 13A allows the refrigerant to pass therethrough without expanding the refrigerant, while in the heating operation, the first expansion valve 13A expands the refrigerant. The first expansion valve 13A is connected to the outdoor heat exchanger 14 via the third flow path 2c.

The outdoor heat exchanger 14 is disposed outside the vehicle interior (e.g., in a front portion of an automobile), and performs heat exchange between the refrigerant and external air supplied by travel of the vehicle and by the fan 16. The outdoor heat exchanger 14 functions as a condenser in the cooling operation, and functions as an evaporator in the heating operation. The outdoor heat exchanger 14 is connected to the second expansion valve 13B via the fourth flow path 2d.

In the cooling operation, the second expansion valve 13B expands the refrigerant, while in the heating operation, the second expansion valve 13B allows the refrigerant to pass therethrough without expanding the refrigerant. The second expansion valve 13B is connected to the second indoor heat exchanger 12B via the fifth flow path 2e.

The second indoor heat exchanger 12B contributes mainly to cooling, and is disposed in the duct 3. In the present embodiment, the second indoor heat exchanger 12B is disposed so as to be located in the second flow path 3B. The second indoor heat exchanger 12B performs heat exchange between the refrigerant and internal air and/or external air supplied by the second blower 42. The second indoor heat exchanger 12B functions as an evaporator both in the cooling operation and in the heating operation. In the present embodiment, the positional relationship between the first indoor heat exchanger 12A and the second indoor heat exchanger 12B in the duct 3 is not particularly limited. In the example illustrated, the second indoor heat exchanger 12B is located on the windward side in the duct 3 with respect to the first indoor heat exchanger 12A. The second indoor heat exchanger 12B is connected to the suction port of the compressor 11 via the sixth flow path 2f. The sixth flow path 2f is provided with an accumulator 15.

Furthermore, the vehicle air conditioner 1A has a configuration for recovering energy from the internal air to be discharged to the outside. Specifically, in the duct 3, a heating exhaust port 35 is provided on the leeward side with respect to the second indoor heat exchanger 12B, and a cooling exhaust port 36 is provided on the leeward side with respect to the first indoor heat exchanger 12A. The heating exhaust port 35 is intended to discharge air cooled in the second indoor heat exchanger 12B to the outside of the vehicle interior in the heating operation, and the cooling exhaust port 36 is intended to discharge air heated in the first indoor heat exchanger 12A to the outside of the vehicle interior in the cooling operation.

Furthermore, the duct 3 is equipped with a heating discharge damper 53 that opens and closes the heating exhaust port 35, and with a cooling discharge damper 54 that opens and closes the cooling exhaust port 36.

The heating discharge damper 53 has a swing axis on the leeward side with respect to the heating exhaust port 35, and swings inwardly in the duct 3 from a closing position for closing the heating exhaust port 35, thereby opening the heating exhaust port 35. That is, when the heating discharge damper 53 has opened the heating exhaust port 35, the heating discharge damper 53 directs air having passed through the second indoor heat exchanger 12B to the heating exhaust port 35. When the heating exhaust port 35 is opened, the heating discharge damper 53 can be stopped at an arbitrary position by a servo motor which is not shown.

The cooling discharge damper 54 has a swing axis on the leeward side with respect to the cooling exhaust port 36, and swings inwardly in the duct 3 from a closing position for closing the cooling exhaust port 36, thereby opening the cooling exhaust port 36. That is, when the cooling discharge damper 54 has opened the cooling exhaust port 36, the cooling discharge damper 54 directs air having passed through the first indoor heat exchanger 12A to the cooling exhaust port 36. When the cooling exhaust port 36 is opened, the cooling discharge damper 54 can be stopped at an arbitrary position by a servo motor which is not shown.

The compressor 11, the first expansion valve 13A, the second expansion valve 13B, and the various dampers 51 to 54, which have been described above, are controlled by the controller 6. The controller 6 is connected to an operating panel (not shown) disposed in the vehicle interior, and performs cooling operation and heating operation. Hereinafter, the operation of the vehicle air conditioner 1A in the cooling operation and in the heating operation will be described. As a typical example, the following describes a case where the vehicle interior is ventilated.

<Cooling Operation>

In the cooling operation, first, the controller 6 opens the first expansion valve 13A fully, and sets the opening degree of the second expansion valve 13B to a predetermined level. Accordingly, the refrigerant discharged from the compressor 11 releases heat in the first indoor heat exchanger 12A and the outdoor heat exchanger 14, is reduced in pressure in the second expansion valve 13B, and then absorbs heat in the second indoor heat exchanger 12B.

Also, the controller 6 sets the first intake damper 51 at the external air blocking position for closing the first flow path 3A side of the external air inlet port 32, and sets the second intake damper 52 at an intermediate position for opening both of the internal air inlet port 31 and the external air inlet port 32 on the second flow path 3B side. At this time, the second intake damper 52 is controlled so that a sufficient amount of external air for ventilation of the vehicle interior is drawn into the duct 3 through the second flow path 3B side of the external air inlet port 32. Further, the controller 6 sets the heating discharge damper 53 at the closing position for closing the heating exhaust port 35, and sets the cooling discharge damper 54 at an opening position for opening the cooling exhaust port 36. Accordingly, in the second flow path 3B, a mixed air of the internal air having flowed through the internal air inlet port 31 and the external air having flowed through the external air inlet port 32 is cooled in the second indoor heat exchanger 12B, and then blown into the vehicle interior through the blowing port 34. On the other hand, in the first flow path 3A, the internal air having flowed through the internal air inlet port 31 cools the refrigerant and is thus heated in the first indoor heat exchanger 12A, and is then discharged to the outside of the vehicle interior through the cooling exhaust port 36.

The flow rate of the air discharged to the outside of the vehicle interior through the cooling exhaust port 36 is preferably equal to or less than the flow rate of the external air drawn into the duct 3 through the second flow path 3B side of the external air inlet port 32. In order to achieve such a condition, the number of revolutions of the first blower 41 is made smaller than the number of revolutions of the second blower 42, for example.

It should be understood that in the case where external air is not introduced into the vehicle interior, such as when ventilation is temporarily stopped at startup of the air conditioner for improvement in temperature characteristics or when ventilation is not needed during parking, the first blower 41 may be stopped, the second intake damper 52 may be set at the external air blocking position, and the cooling discharge damper 54 may be set at the closing position.

<Heating Operation>

In the heating operation, first, the controller 6 opens the second expansion valve 13B fully, and sets the opening degree of the first expansion valve 13A to a predetermined level. Accordingly, the refrigerant discharged from the compressor 11 releases heat in the first indoor heat exchanger 12A and is reduced in pressure in the first expansion valve 13A, and then absorbs heat in the outdoor heat exchanger 14 and the second indoor heat exchanger 12B.

The controller 6 sets the second intake damper 52 at the external air blocking position for closing the second flow path 3B side of the external air inlet port 32, and sets the first intake damper 51 at an intermediate position for opening both of the internal air inlet port 32 and the external air inlet port 32 on the first flow path 3A side. At this time, the first intake damper 51 is controlled so that a sufficient amount of external air for ventilation of the vehicle interior is drawn into the duct 3 through the first flow path 3A side of the external air inlet port 32. Further, the controller 6 sets the cooling discharge damper 54 at the closing position for closing the cooling exhaust port 36, and sets the heating discharge damper 53 at an opening position for opening the heating exhaust port 35. Accordingly, in the first flow path 3A, the mixed air of the internal air having flowed through the internal air inlet port 31 and the external air having flowed through the external air inlet port 32 is heated in the first indoor heat exchanger 12A, and then blown into the vehicle interior through the blowing port 34. On the other hand, in the second flow path 3B, the internal air having flowed through the internal air inlet port 31 heats the refrigerant and is thus cooled in the second indoor heat exchanger 12B, and then discharged to the outside of the vehicle interior through the heating exhaust port 35.

The flow rate of the air discharged to the outside of the vehicle interior through the heating exhaust port 35 is preferably equal to or less than the flow rate of the external air drawn into the duct 3 through the first flow path 3A side of the external air inlet port 32. In order to achieve such a condition, the number of revolutions of the second blower 42 is made smaller than the number of revolutions of the first blower 41, for example.

It should be understood that when no external air is introduced into the vehicle interior, such as when ventilation is temporarily stopped at startup of the air conditioner for improvement in temperature characteristics or when ventilation is not needed during parking, the second blower 42 may be stopped, the first intake damper 51 may be set at the external air blocking position, and the heating discharge damper 53 may be set at the closing position.

As described above, in the cooling operation, heat supply to internal air having been cooled by cooling can be allowed to take place in the first indoor heat exchanger 12A in the course of discharge of the internal air to the outside. On the other hand, in the heating operation, heat removal from internal air having been heated by heating can be allowed to take place in the second indoor heat exchanger 12B in the course of discharge of the internal air to the outside. That is, in either operation, energy can be efficiently used by effectively utilizing the internal air to be discharged to the outside. Moreover, since the ratio between the internal air and the external air is adjustable in each of the first flow path 3A and the second flow path 3B, it is possible to cool or heat only the internal air to be discharged at the time of recovering energy.

When the first intake damper 51 is set at the internal air blocking position in the above-mentioned cooling operation, the first indoor heat exchanger 12A can be allowed to function as an additional outdoor heat exchanger. Also, when the second intake damper 52 is set at the internal air blocking position in the above-mentioned heating operation, the second indoor heat exchanger 12B can be allowed to function as an additional outdoor heat exchanger. In other words, two outdoor heat exchangers can be used in both cases. Therefore, the efficiency of the vehicle air conditioner 1A can be improved. In this case, the same amount of internal air as the external air introduced into the vehicle interior through the duct 3 is discharged to the outside through an exhaust port provided in a rear portion of the vehicle or through gaps between the members constituting the vehicle interior. In this case, unlike in the case where heat exchange is performed with the internal air, there is no limitation on the amount of air because the external air is discharged to the outside.

Since the temperature of the internal air is approximately equal to the temperature of the external air at the starts of the cooling operation and heating operation, it is preferable to set the first intake damper 51 and the second intake damper 52 at the respective internal air blocking positions. This allows the first indoor heat exchanger 12A to function as an additional outdoor heat exchanger at the start of cooling operation and allows the second indoor heat exchanger 12B to function as an additional outdoor heat exchanger at the start of heating operation in the same manner as described above. Thereby, time required for startup can be shortened.

<Modification>

Each of the dampers 51 to 54 need not be driven individually by a single motor, and some of the dampers may be driven by a common motor using a link mechanism or the like.

In addition, although swingable plate-shaped dampers are shown as examples in the drawings, it is also possible to use sliding doors or film doors to open and close the heating exhaust port 35 and the cooling exhaust port 36.

Figure 3:
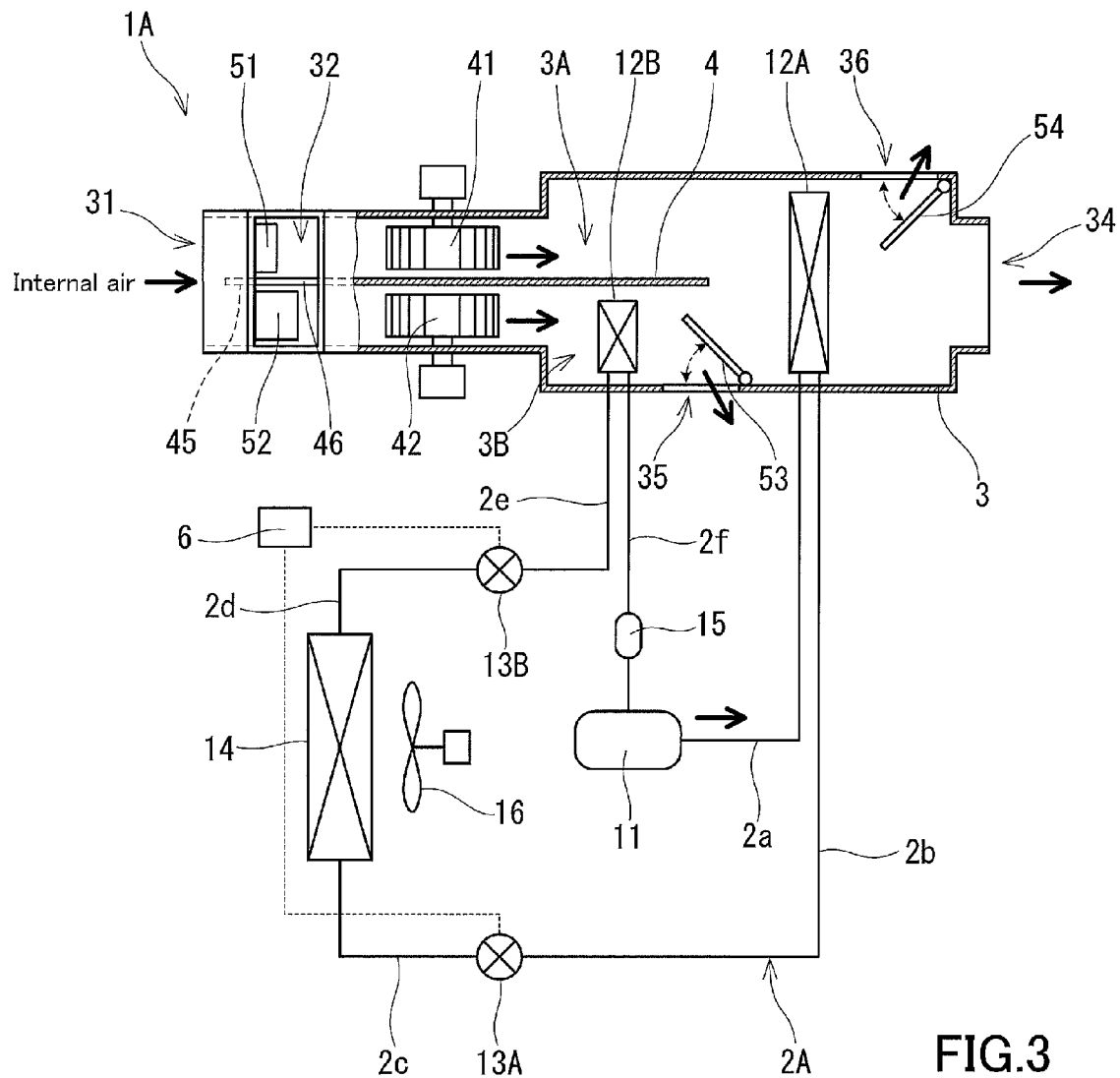
FIG. 3 is a configuration diagram of a vehicle air conditioner according to a modification of the first embodiment.

Furthermore, the first flow path 3A and the second flow path 3B need not necessarily be formed across the approximately entire length of the duct 3, and the first indoor heat exchanger 12A need not necessarily be located in the first flow path 3A. For example, as shown in FIG. 3, the partition member 4 may end between the first indoor heat exchanger 12A and the second indoor heat exchanger 12B located on the windward side with respect to the first indoor heat exchanger 12A, and the first indoor heat exchanger 12A may be disposed so as to face an outlet of the first flow path 3A and an outlet of the second flow path 3B. That is, the first indoor heat exchanger 12A may have a size equivalent to a cross-sectional area of the duct 3. Alternatively, the first indoor heat exchanger 12 may have a size equivalent to the size it has when disposed in the first flow path 3A, and may be disposed one-sidedly so as to face only the outlet of the first flow path 3A.

Second Embodiment

FIG. 4 is a configuration diagram of a vehicle air conditioner 1B according to a second embodiment of the present invention. In the present embodiment, the same components as those of the first embodiment are denoted by the same reference numerals, and the description thereof may be omitted.

The vehicle air conditioner 1B of the present embodiment includes a heat pump circuit 2B in which the flow direction of the refrigerant can be switched. The heat pump circuit 2B includes the compressor 11, a four-way valve 17, the first indoor heat exchanger 12A, an expansion valve 13, the outdoor heat exchanger 14, and the second indoor heat exchanger 12B. These devices are connected by first to seventh flow paths 21 to 27.

Specifically, the discharge port of the compressor 11 is connected to a first port of the four-way valve 17 via the first flow path 21. A second port of the four-way valve 17 is connected to the outdoor heat exchanger 14 via the second flow path 22, and a third port of the four-way valve 17 is connected to the first indoor heat exchanger 12A via the fifth flow path 25. The outdoor heat exchanger 14 and the first indoor heat exchanger 12A are connected to the expansion valve 13 via the third flow path 23 and the fourth flow path 24, respectively. A fourth port of the four-way valve 17 is connected to the second indoor heat exchanger 12B via the sixth flow path 26, and the second indoor heat exchanger 12B is connected to the suction port of the compressor 11 via the seventh flow path 27. The seventh flow path 27 is provided with the accumulator 15.

The expansion valve 13 is intended to expand the refrigerant, and is an example of an expansion mechanism of the present invention. For example, a positive-displacement expander that recovers power from the refrigerant being expanded can be employed as the expansion mechanism of the present invention.

The four-way valve 17 functions as a switching means of the present invention. In the cooling operation, the four-way valve 17 switches the flow direction of the refrigerant in the heat pump circuit 2B to a first direction indicated by dashed arrows, while in the heating operation, the four-way valve 17 switches the flow direction to a second direction indicated by solid arrows. The first direction is a direction in which the refrigerant discharged from the compressor 11 passes though the outdoor heat exchanger 14, the expansion valve 13, the first indoor heat exchanger 12A, and the second indoor heat exchanger 12B in this order to return to the compressor 11. The second direction is a direction in which the refrigerant discharged from the compressor 11 passes through the first indoor heat exchanger 12A, the expansion valve 13, the outdoor heat exchanger 14, and the second indoor heat exchanger 12B in this order to return to the compressor 11.

In the present embodiment, the first indoor heat exchanger 12A functions as an evaporator in the cooling operation and functions as a condenser in the heating operation. The second indoor heat exchanger 12B functions as an evaporator both in the cooling operation and in the heating operation, as in the first embodiment.

Furthermore, in the present embodiment, the partition member 4 provided so that the first flow path 3A and the second flow path 3B are formed in the duct 3 is composed of three partition walls 4A to 4C. Moreover, in the present embodiment, the external air dividing wall 46 (see FIG. 1 and FIG. 2) dividing the external air inlet port 32 is not provided and only the internal air dividing wall 45 dividing the internal air inlet port 31 is provided. The internal air dividing wall 45 divides the internal air inlet port 31 into the first flow path 3A side and the second flow path 3B side at a position apart from the partition member 4. The external air inlet port 32 is disposed on the first flow path 3A side with respect to the internal air inlet port 31. That is, the external air can flow directly into the first flow path 3A through the external air inlet port 32, whereas the external air can flow into the second flow path 3B through a gap between the internal air dividing wall 45 and the partition member 4. The external air inlet port 32 may be disposed on the second flow path 3B side with respect to the internal air inlet port 31. Also, the internal air inlet port 31 and the external air inlet port 32 can be interchanged with each other (that is, only the external air inlet port 32 is divided).

The first partition wall 4A located on the most windward side demarcates a space in which the first blower 41 is disposed and a space in which the second blower 42 is disposed. The first blower 41 and the second blower 42 are uniaxially connected to each other and driven by the same single motor. The second partition wall 4B located at an intermediate position demarcates a space in which the second indoor heat exchanger 12B is disposed and a space forming a route for bypassing the second indoor heat exchanger 12B. The third partition wall 4C located on the most leeward side demarcates a space in which the first indoor heat exchanger 12A is disposed and a space forming a route for bypassing the first indoor heat exchanger 12A.

The first intake damper 51 has a swing axis between the internal air inlet port 31 and the external air inlet port 32, and swings between an internal air blocking position for closing the first flow path 3A side of the internal air inlet port 31 and an external air blocking position for closing the external air inlet port 32. The second intake damper 52 has a swing axis at a position corresponding to the internal air dividing wall 45, and swings between a blocking position for closing the second flow path 3B side of the internal air inlet port 31 and a wall forming position located on a line connecting the swing axis and a windward-side end of the first partition wall 4A. Also in the present embodiment, when the second intake damper 52 swings in a state in which the external air inlet port 32 is opened even slightly by the first intake damper 51, the ratio between the amount of the internal air flowing into the second flow path 3B through the internal air inlet port 31 and the amount of the external air flowing into the second flow path 3B through the external air inlet port 32 is changed.

Between the first partition wall 4A and the second partition wall 4B, a first adjustment damper 56 that can swing between a first blocking position for blocking the first flow path 3A and a second blocking position for blocking the second flow path 3B is provided. Hereinafter, for the convenience of explanation, regarding the first adjustment damper 56, a position located on a line connecting an end of the first partition wall 4A and an end of the second partition wall 4B is referred to as a wall forming position, a position closer to the first blocking position with respect to the wall forming position is referred to as a bypass-side blocking position, and a position closer to the second blocking position with respect to the wall forming position is referred to as a heat exchanger-side reducing position. Between the second partition wall 4B and the third partition wall 4C, a second adjustment damper 57 that can swing between a wall forming position located on a line connecting an end of the second partition wall 4B and an end of the third partition wall 4C and a blocking position for blocking the second flow path 3B is provided.

In the present embodiment, the cooling exhaust port 36 is not provided on the leeward side with respect to the first indoor heat exchanger 12A, and only the heating exhaust port 35 is provided on the leeward side with respect to the second indoor heat exchanger 12B. However, the heating discharge damper 53 can swing between the closing position for closing the heating exhaust port 35 and a blocking position at which one end of the heating discharge damper 53 is close to or in contact with the second partition wall 4B so that the second flow path 3B is blocked.

Hereinafter, the operation of the vehicle air conditioner 1B in the cooling operation and in the heating operation will be described. As typical examples, the following describes a normal cooling operation as the cooling operation, and describes a normal heating operation, dehumidifying heating operation and energy recovering heating operation as the heating operation. The vehicle interior is ventilated in the normal heating operation and the energy recovering heating operation.

<Cooling Operation>

Figure 5:
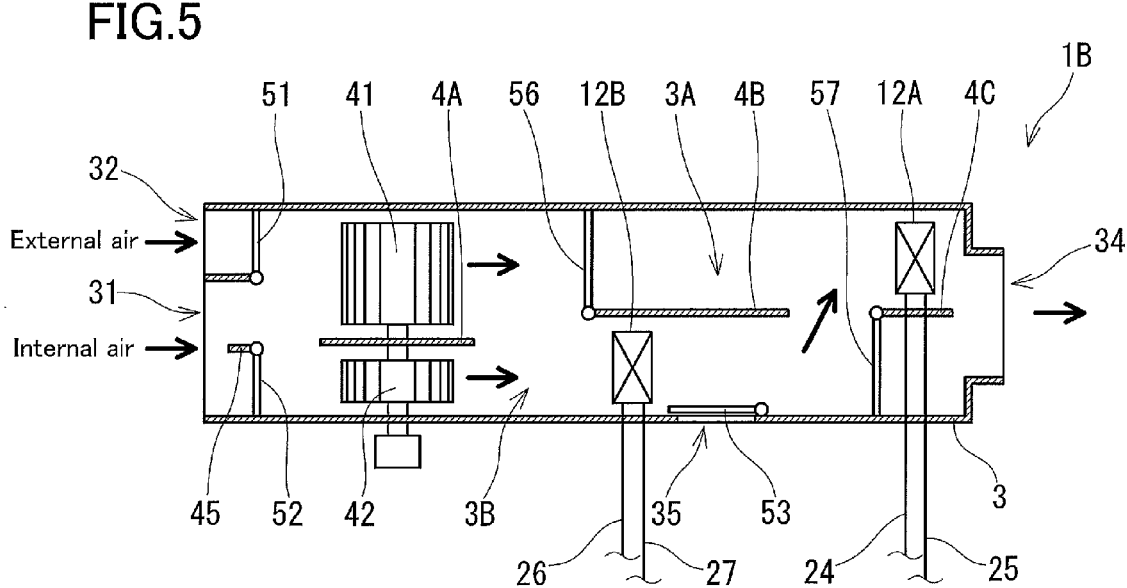
FIG. 5 is a diagram illustrating a state inside a duct in normal cooling operation.

In the normal cooling operation, the controller 6 firstly controls the four-way valve 17 so that the refrigerant flows into the heat pump circuit 2B in the first direction indicated by the dashed arrows. Also, the controller 6 sets the first adjustment damper 56 at the first blocking position for blocking the first flow path 3A, and sets the second adjustment damper 57 at the blocking position for blocking the second flow path 3B, as shown in FIG. 5. Accordingly, the refrigerant discharged from the compressor 11 releases heat in the outdoor heat exchanger 14, is reduced in pressure in the expansion valve 13, and then absorbs heat in the first indoor heat exchanger 12A and the second indoor heat exchanger 12B.

Moreover, the controller 6 sets the first intake damper 51 at the external air blocking position for closing the external air inlet port 32, and sets the second intake damper 52 at the blocking position for closing the second flow path 3B side of the internal air inlet port 31. Further, the controller 6 sets the heating discharge damper 53 at the closing position for closing the heating exhaust port 35. Accordingly, the internal air drawn into the duct 3 through the first flow path 3A side of the internal air inlet port 31 is cooled in the second indoor heat exchanger 12B, and then cooled further in the first indoor heat exchanger 12A and blown into the vehicle interior through the blowing port 34.

<Heating Operation>

Figure 6A:
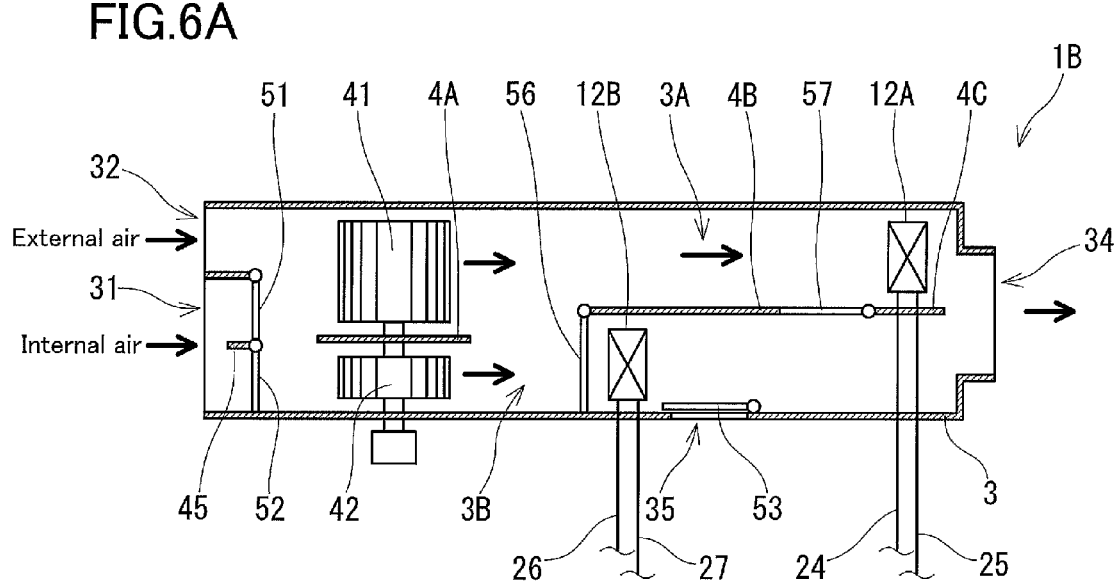
FIG. 6A is a diagram illustrating a state inside the duct in normal heating operation.

In the normal heating operation, the controller 6 firstly controls the four-way valve 17 so that the refrigerant flows into the heat pump circuit 2B in the second direction indicated by the solid arrows. Also, the controller 6 sets the first adjustment damper 56 at the second blocking position for blocking the second flow path 3B, and sets the second adjustment damper 57 at the wall forming position, as shown in FIG. 6A. Accordingly, the refrigerant discharged from the compressor 11 releases heat in the first indoor heat exchanger 12A, is reduced in pressure in the expansion valve 13, and then absorbs heat in the outdoor heat exchanger 14 and passes through the second indoor heat exchanger 12B without heat exchange.

Moreover, the controller 6 sets the first intake damper 51 at the internal air blocking position for closing the first flow path 3A side of the internal air inlet port 31, and sets the second intake damper 52 at the blocking position for closing the second flow path 3B side of the internal air inlet port 31. Further, the controller 6 sets the heating discharge damper 53 at the closing position for closing the heating exhaust port 35. Accordingly, the external air drawn into the duct 3 through the external air inlet port 32 is heated in the first indoor heat exchanger 12A, and then blown into the vehicle interior through the blowing port 34. In this case, the same amount of internal air as the external air introduced into the vehicle interior through the duct 3 is discharged to the outside through gaps between the members constituting the vehicle interior.

Figure 6B:
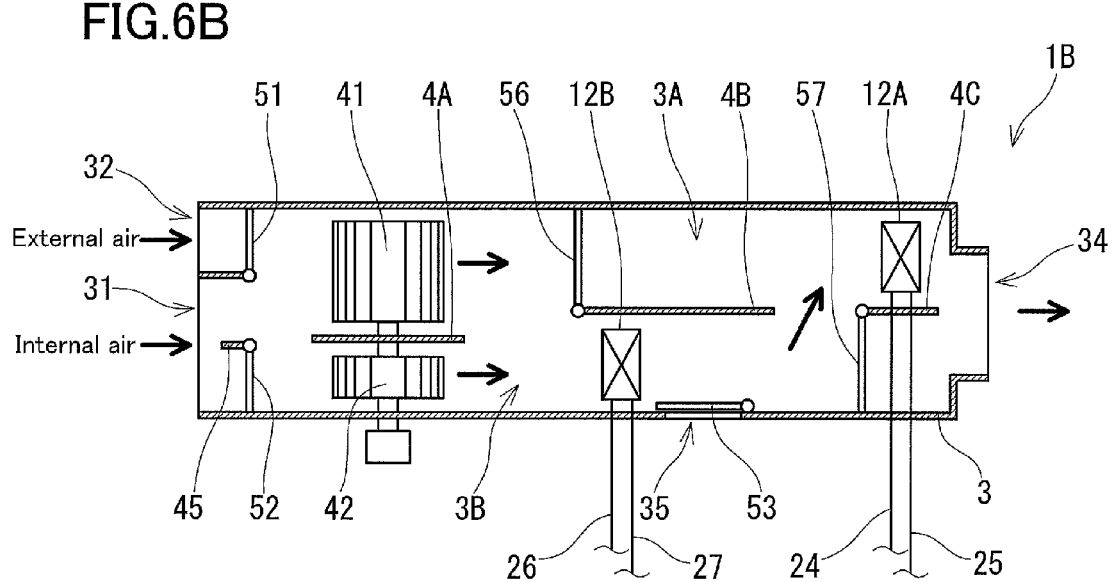
FIG. 6B is a diagram illustrating a state inside the duct in dehumidifying heating operation.

In the dehumidifying heating operation, the first adjustment damper 56 is set at the first blocking position for blocking the first flow path 3A, and the second adjustment damper 57 is set at the blocking position for blocking the second flow path 3B, as shown in FIG. 6B. Accordingly, the refrigerant discharged from the compressor 11 releases heat in the first indoor heat exchanger 12A and is reduced in pressure in the expansion valve 13, and then absorbs heat in the outdoor heat exchanger 14 and the second indoor heat exchanger 12B. The first intake damper 51 is set at the external air blocking position for closing the external air inlet port 32. Accordingly, the internal air drawn into the duct 3 through the first flow path 3A side of the internal air inlet port 31 is cooled and thus dehumidified in the second indoor heat exchanger 12B, and then heated in the first indoor heat exchanger 12A and blown into the vehicle interior through the blowing port 34.

Figure 7:
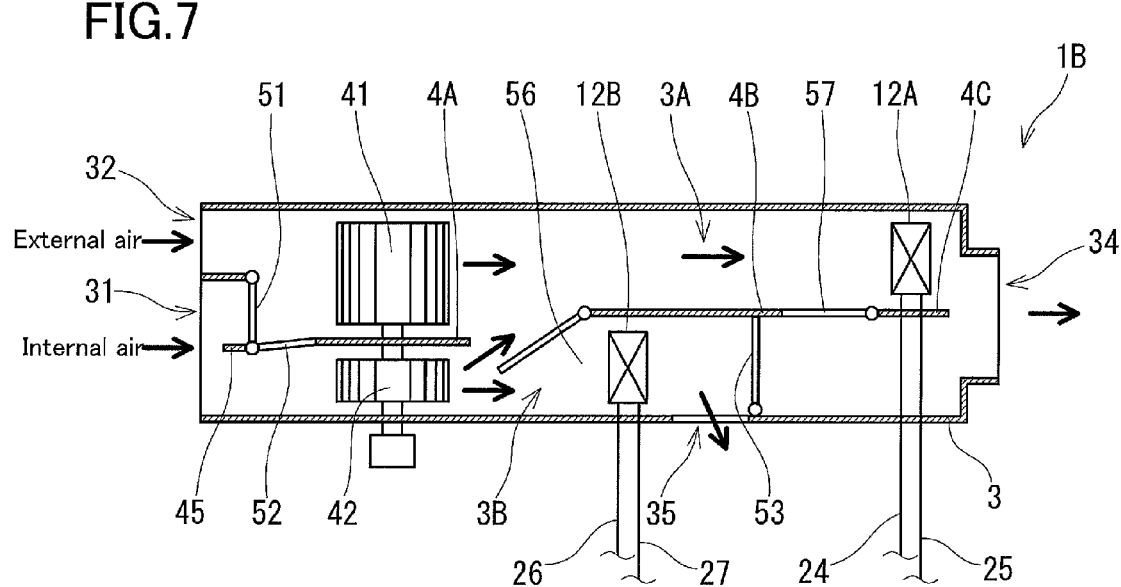
FIG. 7 is a diagram illustrating a state inside the duct in energy recovering heating operation.

In the energy recovering heating operation, the first adjustment damper 56 is set at an intermediate position between the heat exchanger-side reducing position and the wall forming position, and the second adjustment damper 57 is set at the wall forming position, as shown in FIG. 7. The first intake damper 51 is set at the internal air blocking position for closing the first flow path 3A side of the internal air inlet port 31, and the second intake damper 52 is set at the wall forming position. Furthermore, the heating discharge damper 53 is set at the blocking position for blocking the second flow path 3B. Accordingly, the internal air having flowed into the second flow path 3B through the internal air inlet port 31 is divided, by the first adjustment damper 56, into a portion to continuously flow through the second flow path 3B and a portion to flow into the first flow path 3A. The internal air having flowed into the first flow path 3A is mixed with the external air having flowed into the first flow path 3A through the external air inlet port 32 to form a mixed air, and this mixed air is heated in the first indoor heat exchanger 12A and then blown into the vehicle interior through the blowing port 34. In contrast, the internal air having continuously flowed through the second flow path 3B heats the refrigerant and is thus cooled in the second indoor heat exchanger 12B, and is then discharged to the outside of the vehicle interior through the heating exhaust port 35.

Also in such an energy recovering heating operation, heat removal from internal air having been heated by heating can be allowed to take place in the second indoor heat exchanger 12B in the course of discharge of the internal air to the outside, as in Embodiment 1. Therefore, energy can be efficiently used by effectively utilizing the internal air to be discharged to the outside.

Although not shown in the drawing, in the energy recovering heating operation, the heating discharge damper 53 may be set at a position closer to the closing position with respect to the blocking position in a state where the first adjustment damper 56 is set at the wall forming position and the second adjustment damper 57 is set at the blocking position. This makes it possible to dehumidify the internal air even while performing the energy recovering heating operation.

When the second intake damper 52 is moved from the location shown in FIG. 7 and set at the blocking position, the second indoor heat exchanger 12B can be allowed to function as an additional outdoor heat exchanger. That is, two outdoor heat exchangers can be used, and therefore the efficiency of the vehicle air conditioner 1B can be improved. In this case, the same amount of internal air as the external air introduced into the vehicle interior through the duct 3 is discharged to the outside through gaps between the members constituting the vehicle interior.

<Modification>

Figure 8A:
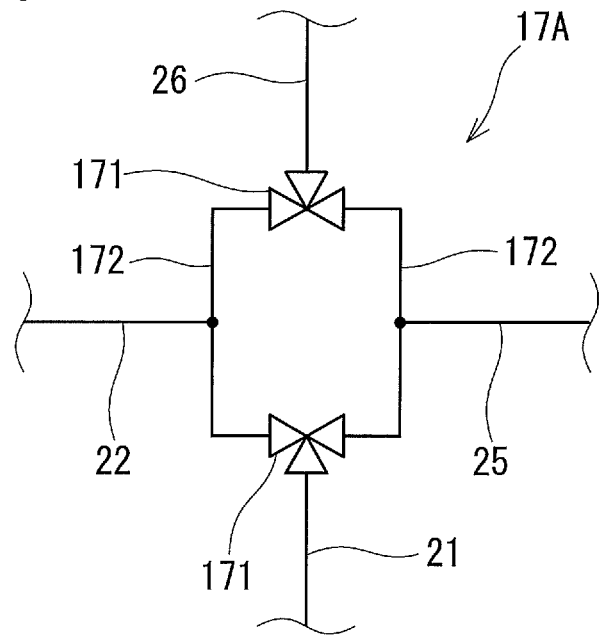
FIG. 8A and FIG. 8B are configuration diagrams of alternative examples of switching means.
Figure 8B:
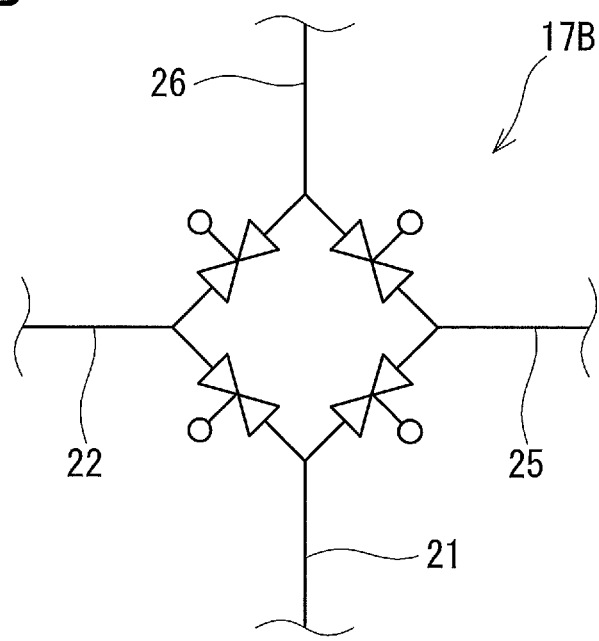
Figure 9A:
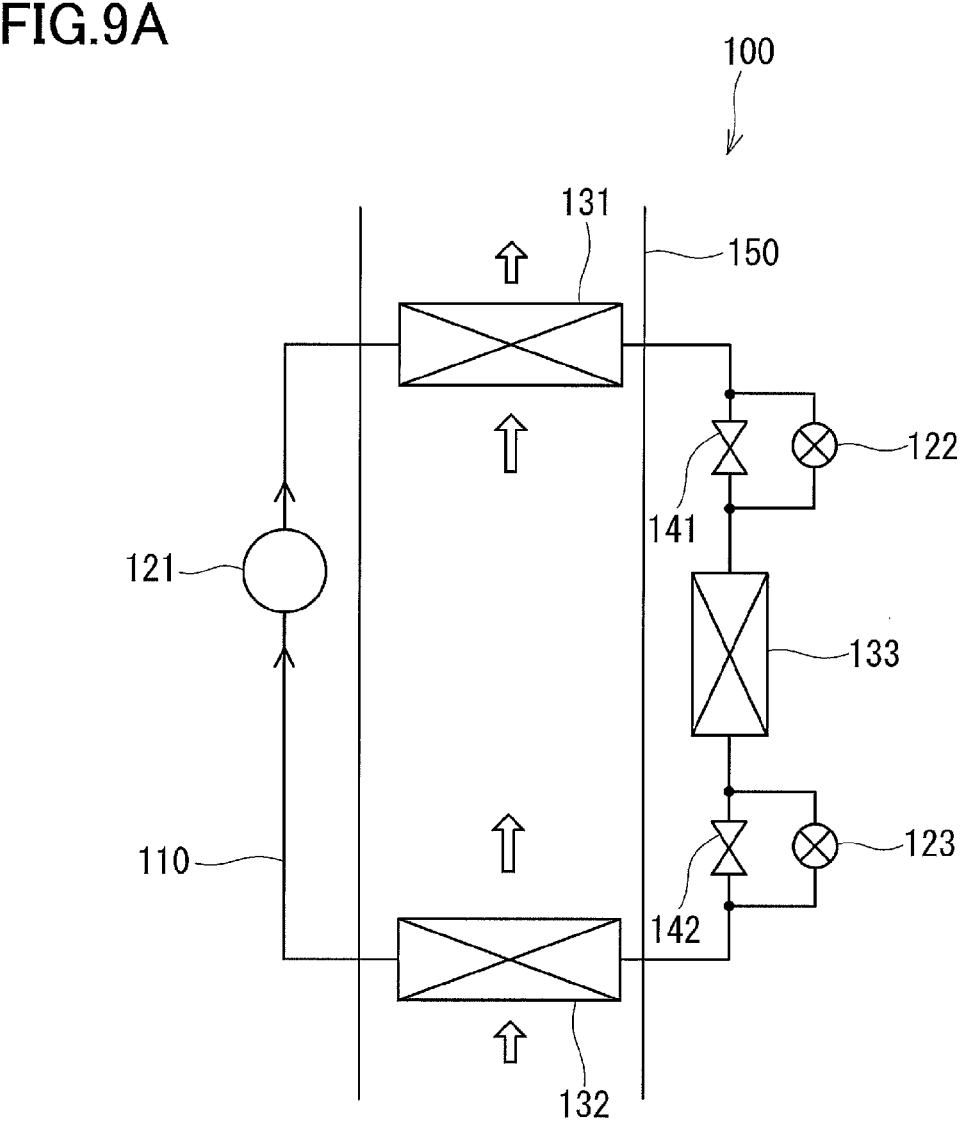
FIG. 9A is a configuration diagram of a conventional vehicle air conditioner.
Figure 9B:
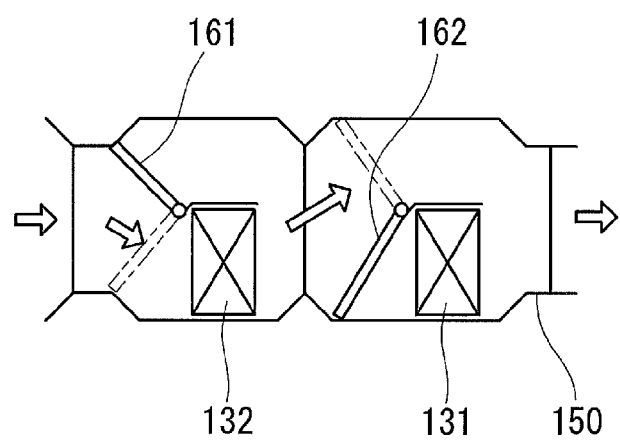
FIG. 9B is a diagram illustrating dampers used in the vehicle air conditioner.

In the above embodiment, the four-way valve 17 is used as the switching means. However, the switching means of the present invention is not limited thereto. For example, the switching means may be a circuit 17A as shown in FIG. 8A, where two three-way valves 171 respectively connected to the first flow path 21 and the sixth flow path 26 are connected in a loop by a pair of pipes 172, and the second flow path 22 and the fifth flow path 25 are respectively connected to the pipes 172. Alternatively, the switching means may be a so-called bridge circuit 17B as shown in FIG. 8B.

In the case where the duct 3 of the above-mentioned embodiment is provided not only with the heating exhaust port 35 but also with the cooling exhaust port 36 described in the first embodiment, the fifth flow path 25 between the first indoor heat exchanger 12A and the four-way valve 17 in the heat pump circuit 2B may be provided with an auxiliary pressure-reducing mechanism whose state can be switched by the controller 6 between an on-state in which the auxiliary pressure-reducing mechanism allows the refrigerant to pass therethrough without reducing the pressure of the refrigerant and an off-state in which the auxiliary pressure-reducing mechanism reduces the pressure of the refrigerant. The auxiliary pressure-reducing mechanism is controlled to be in the off-state in the heating operation and in the normal cooling operation, and is controlled to be in the on-state in a particular type of cooling operation, namely, energy recovering cooling operation for recovering energy from the internal air to be discharged to the outside. When the auxiliary pressure-reducing mechanism is controlled to be in the on-state, the opening degree of the expansion valve 13 is set to a relatively high level. Accordingly, the first indoor heat exchanger 12A, which functions as an evaporator in the normal cooling operation, functions as a condenser in the energy recovering cooling operation. In such a configuration, heat supply to internal air having been cooled by cooling can be allowed to take place in the first indoor heat exchanger 12A in the course of discharge of the internal air to the outside, as in the first embodiment.

Other Embodiments

In the first embodiment and the modification of the second embodiment, the duct 3 is provided with both the heating exhaust port 35 and the cooling exhaust port 36. However, it is sufficient that the duct 3 is provided with at least one of the heating exhaust port 35 and the cooling exhaust port 36. For example, the vehicle air conditioner of the present invention may be configured to have only the heating exhaust port 35 and thus to improve only the heating performance.

Furthermore, the second indoor heat exchanger 12B need not necessarily be located on the windward side in the duct 3 with respect to the first indoor heat exchanger 12A, and the positions of the heat exchangers may be reversed. However, when the second indoor heat exchanger 12B is located on the windward side with respect to the first indoor heat exchanger 12A, use of a configuration such as the modification of the first embodiment and the second embodiment makes it possible to dehumidify, in the second indoor heat exchanger 12B, air flowing in the duct 3 in the heating operation before heating the air in the first indoor heat exchanger 12A.

INDUSTRIAL APPLICABILITY

The vehicle air conditioner of the present invention can perform cooling and heating with efficient use of energy, and is therefore useful particularly for non-combustion type automobiles such as electric automobiles and fuel cell automobiles.

The invention claimed is:
1. A vehicle air conditioner that cools and heats a vehicle interior, the vehicle air conditioner comprising:
a duct having an internal air inlet port and an external air inlet port at one end portion thereof, and a blowing port at another end portion thereof;
a partition member provided so that a first flow path and a second flow path are formed in the duct;
a first air blower disposed in the first flow path;
a second air blower disposed in the second flow path;
a first intake damper that adjusts a ratio between an amount of internal air flowing into the first flow path through the internal air inlet port and an amount of external air flowing into the first flow path through the external air inlet port;
a second intake damper that adjusts a ratio between an amount of internal air flowing into the second flow path through the internal air inlet port and an amount of external air flowing into the second flow path through the external air inlet port;
a heat pump circuit comprising
a first indoor heat exchanger that is disposed in the duct so as to be located in the first flow path or to face an outlet of the first flow path and that contributes to heating,
a second indoor heat exchanger that is disposed in the duct so as to be located in the second flow path and that contributes to cooling, and
an outdoor heat exchanger disposed outside the vehicle interior; and
a controller,
wherein the duct is provided with a heating exhaust port for discharging air cooled in the second indoor heat exchanger to an outside of the vehicle interior in heating operation, and
in the heating operation,
(i) the controller controls the first intake damper to set the first intake damper at an intermediate position for opening both of the internal air inlet port and the external air inlet port, a mixed air of the internal air having flowed through the internal air inlet port and the external air having flowed through the external air inlet port is supplied into the first flow path, and the mixed air supplied into the first flow path is heated in the first indoor heat exchanger and is blown into the vehicle interior through the blowing port, and (ii) the controller controls the second intake damper to set the second intake damper at an external air blocking position for closing the external air inlet port, and the internal air supplied into the second flow path is cooled in the second indoor heat exchanger and is discharged to the outside of the vehicle interior through the heating exhaust port, wherein a flow rate of the internal air discharged to the outside of the vehicle interior through the heating exhaust port is less than a flow rate of the external air drawn into the first flow path through the external air inlet port.

2. The vehicle air conditioner according to claim 1, wherein the duct is provided with the heating exhaust port, and a cooling exhaust port for discharging air heated in the first indoor heat exchanger to the outside of the vehicle interior in cooling operation.

3. The vehicle air conditioner according to claim 2, further comprising a cooling discharge damper that opens and closes the cooling exhaust port, wherein the cooling discharge damper directs air having passed through the first indoor heat exchanger to the cooling exhaust port when the cooling discharge damper has opened the cooling exhaust port.

4. The vehicle air conditioner according to claim 1, wherein the second indoor heat exchanger is located on a windward side in the duct with respect to the first indoor heat exchanger.

5. The vehicle air conditioner according to claim 1, wherein the outdoor heat exchanger functions as an evaporator in the heating operation and functions as a condenser in the cooling operation.

6. The vehicle air conditioner according to claim 5, wherein the heat pump circuit further comprises: a compressor that compresses a refrigerant; a first expansion valve that expands the refrigerant in the heating operation; and a second expansion valve that expands the refrigerant in the cooling operation, and the compressor, the first indoor heat exchanger, the first expansion valve, the outdoor heat exchanger, the second expansion valve, and the second indoor heat exchanger are connected in this order in a loop by flow paths.

7. The vehicle air conditioner according to claim 5, wherein the heat pump circuit further comprises a compressor that compresses a refrigerant, and an expansion mechanism that expands the refrigerant, and the vehicle air conditioner further comprises a switching means that switches a flow direction of the refrigerant in the heat pump circuit to a first direction in the cooling operation and that switches the flow direction to a second direction in the heating operation, the first direction being a direction in which the refrigerant discharged from the compressor passes through the outdoor heat exchanger, the expansion mechanism, the first indoor heat exchanger, and the second indoor heat exchanger in this order to return to the compressor, the second direction being a direction in which the refrigerant discharged from the compressor passes through the first indoor heat exchanger, the expansion mechanism, the outdoor heat exchanger, and the second indoor heat exchanger in this order to return to the compressor.

8. The vehicle air conditioner according to claim 1, further comprising a heating discharge damper that opens and closes the heating exhaust port, wherein the heating discharge damper directs air having passed through the second indoor heat exchanger to the heating exhaust port when the heating discharge damper has opened the heating exhaust port.

9. The vehicle air conditioner according to claim 8, wherein when no external air needs to be introduced into the vehicle interior, the second air blower is stopped, the first intake damper is set at an external air blocking position, and the heating discharge damper is set at a closing position.

10. The vehicle air conditioner according to claim 1, further comprising:

an internal air dividing wall dividing the internal air inlet port; and an external air dividing wall dividing the external air inlet port, wherein the internal air dividing wall and the external air dividing wall are continuous with the partition member.

11. A method of controlling a vehicle air conditioner that cools and heats a vehicle interior, the vehicle air conditioner comprising:

a duct having an internal air inlet port and an external air inlet port at one end portion thereof, and a blowing port at another end portion thereof;

a partition member provided so that a first flow path and a second flow path are formed in the duct;

a first air blower disposed in the first flow path;

a second air blower disposed in the second flow path;

a first intake damper that adjusts a ratio between an amount of internal air flowing into the first flow path through the internal air inlet port and an amount of external air flowing into the first flow path through the external air inlet port;

a second intake damper that adjusts a ratio between an amount of internal air flowing into the second flow path through the internal air inlet port and an amount of external air flowing into the second flow path through the external air inlet port; and a heat pump circuit comprising:

a first indoor heat exchanger that is disposed in the duct so as to be located in the first flow path or to face an outlet of the first flow path and that contributes to heating, a second indoor heat exchanger that is disposed in the duct so as to be located in the second flow path and that contributes to cooling, and an outdoor heat exchanger disposed outside the vehicle interior, wherein the duct is provided with a heating exhaust port for discharging air cooled in the second indoor heat exchanger to an outside of the vehicle interior in a heating operation, the method comprising, in the heating operation: (i) setting the first intake damper at an intermediate position for opening both of the internal air inlet port and the external air inlet port; and (ii) setting the second intake damper at an external air blocking position for closing the external air inlet port, wherein a flow rate of the internal air discharged to the outside of the vehicle interior through the heating exhaust port is lower than a flow rate of the external air drawn into the first flow path through the external air inlet port.

12. The method of controlling the vehicle air conditioner according to claim 11, wherein when no external air needs to be introduced into the vehicle interior, stopping the second air blower, setting the first intake damper at an external air blocking position, and setting the heating discharge damper at a closing position.

* * * * *